United States Patent [19]

Kawachi et al.

[11] Patent Number: 4,978,188

[45] Date of Patent: Dec. 18, 1990

[54] INTEGRATED OPTICAL DEVICE AND METHOD FOR MANUFACTURING THEREOF

[75] Inventors: Masao Kawachi, Mito; Norio Takato, Katsuta; Kaname Jinguji; Akio Sugita, both of Mito, all of Japan; Shin Sumida, Columbus, Ohio

[73] Assignee: Nippon Telegraph and Telephone Corporation, Tokyo, Japan

[21] Appl. No.: 421,400

[22] Filed: Oct. 13, 1989

Related U.S. Application Data

[62] Division of Ser. No. 211,556, Jun. 24, 1988, Pat. No. 4,900,112.

[30] Foreign Application Priority Data

Jun. 29, 1987 [JP] Japan .................................. 162164
May 16, 1988 [JP] Japan .................................. 116938

[51] Int. Cl.5 .............................................. G02B 6/12
[52] U.S. Cl. ................................ 350/96.12; 350/96.29
[58] Field of Search ................... 427/162; 65/3.1, 3.11, 65/3.41; 350/96.29, 96.11–96.15

[56] References Cited

U.S. PATENT DOCUMENTS 4,561,718 12/1985 Nelson .............................. 350/96.14
4,578,097 3/1986 Berkey ................................. 65/3.11
4,692,190 9/1987 Komatsu ........................... 357/65 X
4,781,425 11/1988 Risk et al. ........................ 350/96.15
4,900,112 2/1990 Kawachi et al. ................. 350/96.12

Primary Examiner—John D. Lee
Assistant Examiner—John Ngo
Attorney, Agent, or Firm—Spencer & Frank

[57] ABSTRACT

An integrated optical device includes a substrate; a single-mode optical waveguide having a cladding layer disposed on the substrate and a core portion embedded in the cladding layer for transmitting light therethrough; and a stress applying film disposed on a desired portion of the cladding layer for adjusting stress-induced birefringence of the single-mode optical waveguide by irreversibly changing the stress exerted on the core portion by a trimming technique. The integrated optical device can be manufactured by the steps of forming a cladding layer on a substrate; forming a single-mode optical waveguide having a core portion embedded in the cladding layer for transmitting light therethrough; and forming, on the cladding layer, a stress applying film for exerting a stress on the single-mode optical waveguide to irreversibly change the stress by trimming the film. The device exhibits a precisely adjusted birefringence and a desired polarization dependence or independence, and is effective for constructing an integrated optical device for optical communication, for optical sensing or for optical signal processing, in which the polarization characteristics play an important role.

19 Claims, 16 Drawing Sheets

INTEGRATED OPTICAL DEVICE AND METHOD FOR MANUFACTURING THEREOF

This is a division of application Ser. No. 07/211,556 June 24, 1988 (now U.S. Pat. No. 4,900,112).

BACKGROUND OF THE INVENTION

1. Field of the Invention

The present invention relates to an integrated optical device having a substrate and optical waveguides disposed thereon and a method for manufacturing such a device. More particularly, the present invention relates to an integrated optical device so structured as to exhibit a desired polarization dependence or independence by adjusting the birefringence of optical waveguides of the device and to a method for manufacturing the device.

2. Description of the Prior Art

A single-mode channel optical waveguide formed on a planar substrate, in particular a silica-based single-mode channel optical waveguide formed on a silicon substrate, is described in, for instance, the article by N. Takato et al. entitled "Guided-Wave Multi/Demultiplexer for Optical FDM Transmission" (Technical Digest of ECOC '86, p. 443). In such a silica-based single-mode channel optical waveguide, the size of the cross section of the core portion thereof can be established at 5 to 10 μm which is consistent with that of a commonly used silica-based single-mode channel optical fiber. Therefore, it is expected that the silica-based single-mode optical waveguide can be used as a means for obtaining practically useful integrated optical devices which are excellent in matching properties with an optical fiber.

FIGS. 14A and 14B are, respectively, a plan view and an enlarged sectional view taken along line A-A' in FIG. 14A, illustrating a configuration of a guided-wave Mach-Zehnder interferometer as an example of such a conventional integrated optical device in which this kind of silica-based single-mode channel optical waveguide is employed.

In FIGS. 14A and 14B, reference numeral 1 denotes a silicon substrate. Reference numerals 2 and 3 denote directional couplers formed, on the silicon substrate 1, from a silica-based glass material. The directional couplers 2 and 3 are comprised, respectively, of a pair of two silica-based single-mode channel optical waveguides 2-1 and 2-2, and 3-1 and 3-2 adjacent to one another, and each coupling factor thereof is established to be about 50%. Reference numerals 4 and 5 represent two optical waveguides. The optical waveguide 4 connects the optical waveguides 2-1 and 3-1 of the directional couplers 2 and 3 to each other. The optical waveguide 5 connects the optical waveguides 2-2 and 3-2 of the direction couplers 2 and 3. The optical waveguide 4 is longer, by ΔL, than the optical waveguide 5. Each of these optical waveguides 2-1, 2-2, 3-1, 3-2, 4 and 5 is comprised of a core glass portion embedded in a cladding glass layer 12 disposed on the substrate 1. The optical waveguides 2-1 and 2-2 are provided with input ports 1a and 2a and the optical waveguides 3-1 and 3-2 are provided with output ports 1b and 2b. In addition, a thin film heater 6 is disposed on the cladding glass 12 and above the optical waveguide 5.

In this optical device, it is known that optical signals can alternatively be outputted from the output ports 1b and 2b with a period (Δf) represented by the following formula:

$$\Delta f = c/2n\Delta L$$

(wherein c represents light velocity and n is the refractive index of the optical waveguide), as the frequency of the optical signal inputted through the input port 1a is varied.

On the other hand, FIG. 15 shows the periodic characteristics of the interferometer shown in FIGS. 14A and 14B. That is, FIG. 15 illustrates the frequency characteristics of the output light from the output ports 1b and 2b observed when a TE polarized wave having a polarization direction parallel to the substrate 1 is inputted as a signal light to the input port 1a. In FIG. 5, the solid line curve represents the frequency characteristics of the output light from the output port 1b and the broken line curve represents the frequency characteristics of the output light from the output port 2b.

In this respect, it is, for instance, assumed that two optical signals $f_1$ and $f_2$ having a frequency difference (Δf) therebetween of 10 GHz are simultaneously inputted through the input port 1a in the band of 1.55 μm. If ΔL in the aforementioned formula is established at about 10 mm, the two optical signals $f_1$ and $f_2$ can separately be outputted from the output ports 1b and 2b. In practice, the thin film heater 6, which serves as a phase shifter for changing the effective optical path of the optical waveguide 5 by approximately one wavelength in accordance with the thermo-optical effect, is disposed on one optical waveguide 5 and the electric voltage applied to the thin film heater 6 is so adjusted to synchronize the foregoing period of the guided-wave Mach-Zehnder interferometer with the frequencies of the optical signals $f_1$ and $f_2$ and to output a desired optical signal from a desired output port, whereby the Mach-Zender interferometer shown in FIGS. 14A and 14B as a whole functions as a optical frequency division multi/demultiplexer.

Such a device can be manufactured in accordance with a conventional method which mainly utilizes the techniques for depositing a silica-based glass film onto a silicon substrate and for finely processing the resultant glass film by reactive ion etching.

However, the guided-wave Mach-Zehnder interferometer shown in FIGS. 14A and 14B is affected by a strong compression stress generated within the surface of the glass film due to the difference of the thermal expansion coefficient between the silica-based glass and the silicon substrate. As a result, the optical waveguide exhibits a stress-induced birefringence of the order of $B_O = 5 \times 10^{-4}$ (expressed in the value of birefringence). Here, $B_O = n_{TM} - n_{TE}$, wherein $n_{TE}$ is the effective refractive index of a TE polarized wave and $n_{TM}$ is the effective refractive index of a TM polarized wave. In other words, the effective refractive indexes n (i.e., $n_{TE}$ and $n_{TM}$) differ from one another by $B_O$ depending on the polarization direction of the incident light. This causes a deviation in the phase of the above-described periodic characteristics of the interferometer depending on the polarization directions. As a result, there is the problem that the interferometer does not function as an optical frequency division multi/demultiplexer at all, unless the polarization direction of an optical signal is previously adjusted to a direction either parallel (TE polarized wave) to or vertical to (TM polarized wave) the surface of the substrate.

It is known that if the value of the birefringence of the optical waveguide constituting an interferometer such as shown in FIGS. 14A and 14B can be freely controlled, the guided-wave interferometer can be so designed that the periodic characteristics of the TE polarized wave apparently coincide with those of the TM polarized wave. Namely, such an interferometer may be obtained by adjusting the birefringence of the optical waveguide, so that a slight difference ($B_O \cdot \Delta L$) in the difference between the optical paths ($\Delta L$) of the interferometer due to the polarization direction is made equal to m times the wavelength of the signal light (wherein m is an integer inclusive of zero).

In the conventional methods for manufacturing integrated optical devices, however, the only method for controlling the birefringence is to change the composition of the glass used for making waveguides or the kind of substrate. This causes a problem when sophisticated integrated optical devices are constructed. Alternatively, the value of the birefringence of an optical waveguide can be varied by changing the cross sectional shape of its core portion from square to a longitudinally or transversely elongated rectangular shape to make use of the shape effect. However, the variation in the birefringence in this case is only of the order of $10^{-5}$ and this variation is not practically sufficient. In this case, if the cross sectional shape is an extreme rectangular shape, there is the problem that connection losses when the input and output ports are connected to optical fibers are extremely increased.

In order to eliminate the above-described problems of the guided-wave interferometer, an interferometer provided with one or more grooves for adjusting a stress-induced birefringence is proposed, for instance, in the article by M. Kawachi et al., entitled "Birefringence control in high-silica single-mode channel waveguides on silicon" (Technical Digest of OFC/IOOC '87, TUQ31) or European patent application Laid-Open No. EP-0255270-A2.

FIGS. 16A and 16B are, respectively, a plan view and an enlarged cross sectional view taken along line A-A' of FIG. 16A, both showing an example of the configuration of such an interferometer provided with grooves for adjusting the stress-induced birefringence. This example differs from that shown in FIGS. 14A and 14B in that the former has stress adjusting grooves 21a and 21b for controlling the stress-induced birefringence of the optical waveguide by releasing a part of the stress from the substrate 1. The stress adjusting grooves 21a and 21b are disposed on the cladding glass layer 12 adjacent to the core portion of the optical waveguide 4 and can be formed by a reactive ion etching process. In principle, it seems that the dependence of the interferometer upon the inputted polarized wave can certainly be eliminated by establishing the position, depth, width and length of the grooves 21a and 21b, so that the slight difference in the difference $\Delta L$ between the optical paths of the interferometer due to the polarization directions is made equal to m times the wavelength of the signal light (m is an integer). This structure, however, has the following problem concerning the manufacture thereof.

When an integrated optical device having such a construction as that shown in FIGS. 16A and 16B is manufactured, the stress adjusting grooves 21a and 21b are formed by removing a part of the cladding layer 12 by a reactive ion etching process. It is, however, impossible to simultaneously measure (perform on-line monitoring) the polarization characteristics of the interferometer during the ion etching process. This is because the reactive ion etching process is effected using plasma within a vacuum chamber and, therefore, it is difficult to form such a groove while monitoring the polarization characteristics by introducing a monitoring light into the processed interferometer. As a consequence, the processed device is sometimes etched excessively and thus it is difficult to obtain an interferometer exactly turned to desired polarization characteristics.

There has been proposed a further method in which a stress applying portion is formed in the cladding layer 12 in the vicinity of the core portion of the optical waveguide instead of forming the stress adjusting grooves 21a and 21b shown in FIGS. 16A and 16B, so that the value of birefringence in a desired part of the optical waveguide is adjusted. FIG. 17 is a cross sectional view showing an example of such a conventional optical waveguide provided with such stress applying portions. In accordance with this construction, the stress applying portions 22a and 22b of polycrystalline silicon are arranged on both sides of the core portion 4 and in the vicinity thereof to adjust the birefringence of the optical waveguide 4. In order to exactly adjust the birefringence at a desired value according to this method, the shape, position and required length of the stress applying portions 22a and 22b must be determined on the basis of an accurate calculation of stress distribution. In accordance with the results, a glass film and a silicon film must be deposited and etched, without any error, to form an optical waveguide structure with the desired stress applying portions thereon. However, such procedures can be carried out only with great difficulties concerning processing.

While the importance of the birefringence adjustment of optical waveguides in the manufacture of integrated optical devices and the problems associated with the conventional methods for producing the devices have been discussed with respect to the dependence of a guided-wave Mach-Zehnder interferometer upon the inputted polarized wave as an example, the same problems likewise arise when manufacturing other integrated optical devices such as optical ring resonators, Fabry-Perot resonators, polarization beam splitters, mode converters, wave plates, directional coupler and so on.

In the case of fabricating integrated optical devices provided with a single-mode optical waveguide formed from materials other than the material for a silica-based single-mode optical waveguide, it is also desired to adjust the birefringence of the optical waveguide to produce devices exhibiting desired polarization characteristics. For example, in integrated optical devices essentially provided with an ion-diffused glass waveguide in which a core portion is formed by diffusing ions capable of increasing the refractive index of the multi-component glass into desired portions on the surface of a substrate composed of the multi-component glass, it is known that the core portion of the optical waveguide is affected by stress from the substrate and thereby a stress-induced birefringence is created therein. In order to impart a desired polarization dependence to an integrated optical device, it is, of course, necessary to precisely control the stress-induced birefringence. There has, however, never been known a method for precisely tuning a value of the birefringence, while allowing errors associated with the fabrication of the optical waveguide.

In addition to the glass type integrated optical devices discussed above, it is also very important to precisely control the birefringence value of optical waveguides when fabricating integrated optical devices in which optical waveguides of LiNbO$_3$ type materials; optical waveguides of semiconductors such as InP or GaAs; and optical waveguides of magnetic materials such as YIG type materials are used. For instance, an attempt has been made to fabricate an integrated optical isolator composed of a GGG substrate and a YIG type optical waveguide formed thereon. However, it is necessary that the stress-induced birefringence of the YIG type optical waveguide due to the stress from the GGG substrate be restricted to zero in order to ensure smooth Farady rotation of the polarization plane while the optical signal is transmitted through the YIG type optical waveguide.

For this purpose, a method for forming a silica glass film serving as stress-induced portions on the YIG type optical waveguide has been proposed. However, it is difficult to precisely control the birefringence value of the resulting waveguide for the same reasons as discussed above in connection with the conventional embodiments shown in FIGS. 16A, 16B and 17.

Alternatively, a method for cancelling the stress from the GGG substrate by applying a weight to the upper portion of the YIG optical waveguide has been proposed. However, there is a high possibility that the GGG substrate per se will be damaged by the application of the weight. In addition, such a solution has not been practically acceptable when a variety of optical elements are integrated on a single substrate.

The aforementioned drawbacks associated with the conventional methods for fabricating integrated optical devices, i.e., the lack of precise and easy control of the birefringence value of the optical waveguide is a serious obstacle in designing and fabricating integrated optical devices such as interferometers, a ring resonators, polarization beam splitters, isolators and so on, in which the birefringence characteristics of the optical waveguide play an important role.

SUMMARY OF THE INVENTION

Accordingly, it is an object of the present invention to provide an integrated optical device and a method for manufacturing the device, which eliminates the above-described disadvantages associated with the conventional techniques to precisely control the birefringence value of optical waveguides used in such optical devices.

It is another object of the present invention to provide an integrated optical device with a desired polarization dependence or without a polarization dependence and a method for manufacturing the device.

The foregoing and other purposes of the present invention can effectively be achieved by providing an integrated optical device which comprises a substrate; a single-mode optical waveguide having a cladding layer disposed on the substrate and a core portion embedded in the cladding layer and for transmitting light therethrough; and a stress applying film disposed on a desired portion of the cladding layer and for adjusting stress-induced birefringence of the single-mode optical waveguide by irreversibly changing a stress exerted on the core portion by trimming the stress applying film.

Here, the stress applying film may be an amorphous silicon film.

The single-mode optical waveguide may be a silica-based optical waveguide having SiO$_2$ as its major component.

According to another aspect of the present invention, there is provided a method for manufacturing an integrated optical device comprising the steps of: forming a single-mode optical waveguide on a substrate, the single-mode optical waveguide having a core portion embedded in the cladding layer and for transmitting light therethrough; and forming, on the cladding layer, a stress applying film for exerting a stress on the single-mode optical waveguide and for irreversibly changing the stress by trimming the stress applying film.

Here, the method may further comprise the step of partially trimming the stress applying film to adjust a stress-induced birefringence value of a part of the single-mode optical waveguide lying under the trimmed portion of the stress applying film to adjust optical characteristics of the integrated optical device.

A monitoring light may be made incident upon the integrated optical device in the step of trimming the stress applying film to trim the stress applying film while monitoring the desired optical characteristics.

In the step of trimming the stress applying film, the stress applying film may be trimmed by partially irradiating a light beam on the stress applying film.

The integrated optical device according to the present invention differs from the conventional optical device provided with the stress adjusting grooves shown in FIGS. 16A and 16B or the stress applying portions shown in FIG. 17, in that the birefringence value can be adjusted without changing the compositions of the optical waveguide and the materials of the substrate used. In addition, the stress applying film need not be formed accurately, in accordance with the method of the present invention. A desired birefringence characteristics can be imparted to the optical device by trimming the stress applying film in a post-processing. According to the method of the present invention, the stress applying film can be trimmed, while monitoring specific device characteristics such as the polarization characteristics of an integrated optical device, by introducing a monitoring light into the integrated optical device. Therefore, the birefringence and in turn the polarization characteristics of the optical devices can be very precisely controlled in accordance with the present invention.

The concept of trimming per se has been known in the fabrication of hybrid integrated circuits in the field of electronic circuits, in which a film of resistance material deposited or printed on a substrate is partially cut by a laser beam to precisely determine the resistance thereof to a desired value. Alternatively, in the field of integrated optical devices, there has been proposed the use of such a trimming technique for the purpose of compensating an error due to the fabrication process of a directional coupler by tuning the coupling factor thereof. In this case, a film of a material having a variable refractive index which is changed in accordance with light irradiation, for instance, a chalcogenide glass film, is formed on the upper portion of the light coupling portion of an LiNbO$_3$ directional coupler and the coupling factor thereof is adjusted by irradiating ultraviolet radiation onto the chalcogenide glass film.

There has never been proposed a method for manufacturing birefringence type integrated optical devices exhibiting a desired polarization characteristics by changing the stress applied to the optical waveguide by trimming the stress applying film so that the birefringence value thereof is adjusted.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiment 1

Figure 1:
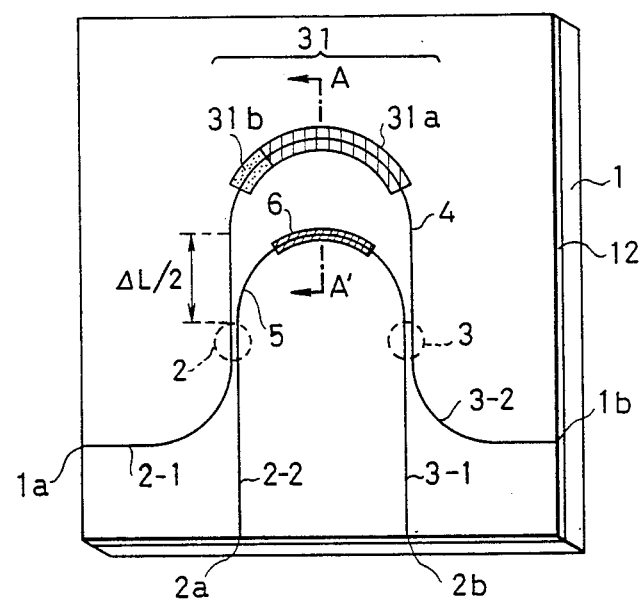
FIG. 1 is a perspective view showing an interferometer as the first embodiment of an integrated optical device according to the present invention.

The configuration of a guided-wave interferometer as the first embodiment of an integrated optical device according to the present invention is shown in FIG. 1 as a perspective view.

Figure 14A:
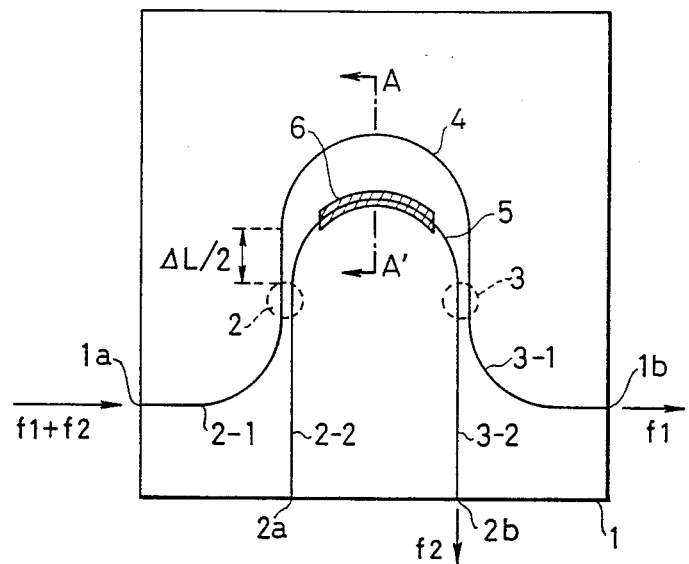
FIGS. 14A and 14B are a plan view and a cross sectional view, taken along line A-A' in FIG. 14A, showing the construction of an interferometer as an example of a conventional integrated optical device, respectively.
Figure 14B:
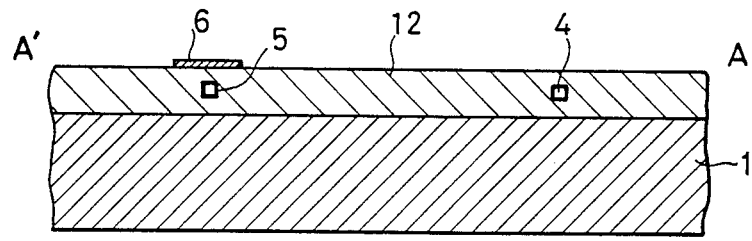
Figure 15:
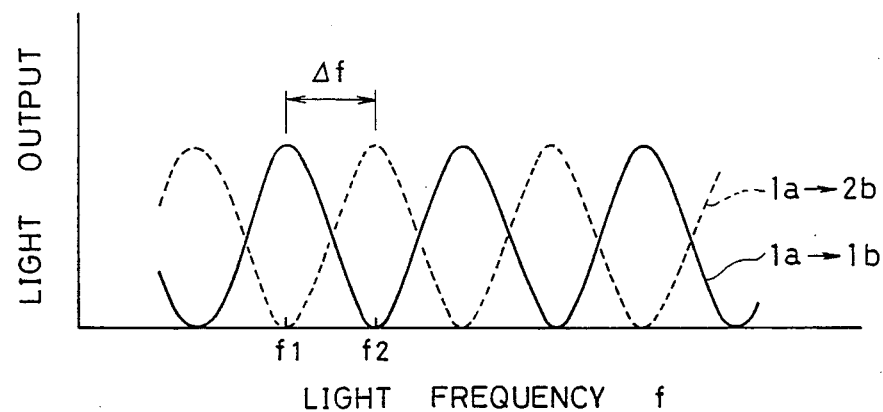
FIG. 15 is an explanatory diagram illustrating the frequence characteristics of the conventional interferometer.
Figure 17:
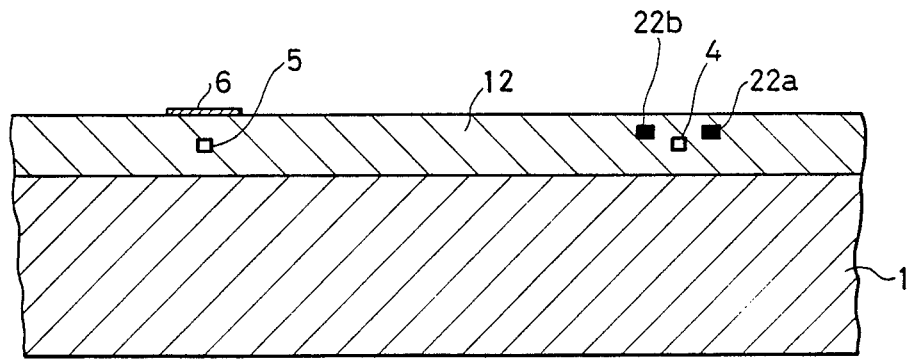
FIG. 17 is a cross sectional view showing a further example of the construction of a conventional integrated optical device.
Figure 16A:
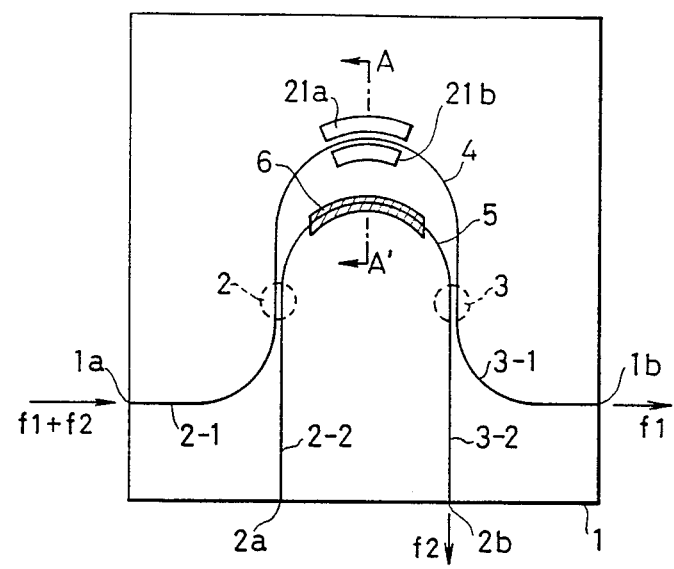
FIGS. 16A and 16B are a plan view and a cross sectional view, taken along line A-A' in FIG. 16A, showing another example of the construction of a conventional integrated optical device, respectively.
Figure 16B:
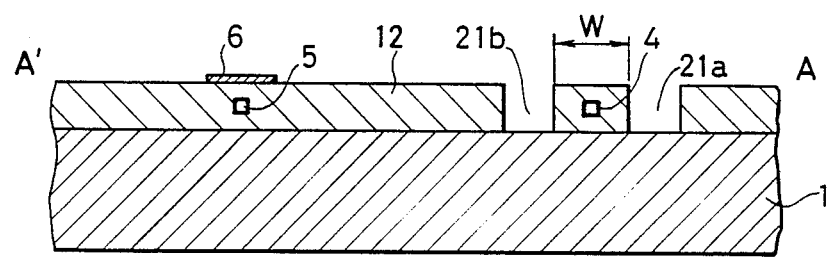

This embodiment 1 differs from the conventional structures shown in FIGS. 14A and 14B or in FIGS. 16A and 16B in that a stress applying film 31 is disposed on a portion existing on a cladding layer 12 and corresponding to an optical waveguide 4 which connects two directional couplers 2 and 3 each having a coupling factor of 50%. The stress applying film 31 can irreversibly change a stress applied to a core portion by external stimulation or excitation.

In FIG. 1, the cladding layer 12 of the silicabased single-mode optical waveguides 4 and 5 formed on a silicon substrate 1 is composed of $SiO_2$ glass having a thickness of 50 $\mu$m. The core portion is made of $SiO_2$-$TiO_2$ glass having a square section of 8 $\mu$m × 8 $\mu$m and arranged at the center of the cladding layer 12. The stress applying film 31 is an amorphous silicon film which is formed on a part of the surface of the cladding layer 12 and which has a thickness of 6 $\mu$m and a width of 200 $\mu$m. The stress applying film is partially converted into polycrystalline silicon due to a phase transition by the application of external stimulation such as irradiation with a laser beam, if so required, so that the strength of the stress exerted on the core portion below the film is changed. Thus, after the completion of the trimming process, the stress applying film 31 is divided into two parts, i.e., a part 31a not trimmed yet (in this case, amorphous region) and a trimmed part 31b (in this case, polycrystalline region). Moreover, a thin film heater 6 is arranged on the cladding glass layer 12 and over the optical waveguide 5.

In a conventional device having no stress applying film 31 formed thereon, the stress-induced birefringence value B of a single-mode optical waveguide is equal to about $5 \times 10^{-4}$, which reflects the compression stress from the substrate. On the contrary, in the device provided with the stress applying film 31, the film 31 exerts a tensile stress on the optical waveguide 4, so that the tensile stress serves to partially cancel the compression stress from the substrate 1 and as a result, the birefringence value B of the optical waveguide 4 below the stress applying film 31 is reduced to about $3.5 \times 10^{-4}$. However, the inventors of the present invention have found that if a part 31b of the stress applying film 31 is converted into the polycrystalline form by irradiating to heat it with, for instance, a laser beam, the stress of the stress applying film 31 in the trimmed region 31b is relaxed and that the birefringence value B almost returns to its original value of about $5 \times 10^{-4}$.

The laser beam trimming operation can be carried out, while introducing monitoring light into an input port 1a or 2a of the processed interferometer. Therefore, on the basis of the results obtained by the monitoring light, the birefringence value of the optical waveguide can be accurately adjusted to impart a desired polarization dependence or polarization independence to the interferometer.

An embodiment of a method of the present invention for manufacturing such an integrated optical device will be explained below with reference to FIGS. 2A to 2E. FIGS. 2A to 2E are sectional views taken along line A-A' in FIG. 1 and correspond to respective steps in the method of the present invention.

Figure 2A:
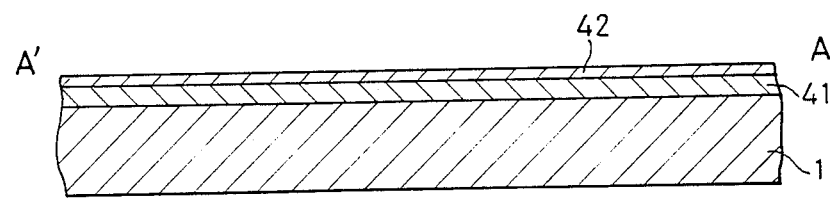
FIGS. 2A to 2E are cross sectional views illustrating steps in one embodiment of a method for manufacturing integrated optical devices according to the present invention.

First, referring to FIG. 2A, an optical waveguide film composed of a lower cladding layer 41 having $SiO_2$ as its major component and a core layer 42 having $SiO_2$-$TiO_2$ as its major component is formed on a silicon substrate 1 in accordance with a conventional method such as that disclosed in the article by M. Kawachi et al. entitled "Flame Hydrolysis Deposition of $SiO_2$-$TiO_2$ Glass Planar Optical Waveguides on Silicon" (Jpn. J. Appl. Phys., 1983, Vol. 22, p. 1932). According to this method, fine glass particles formed by a flame hydrolysis reaction of a gas mixture such as $SiCl_4$, $TiCl_4$ or the like as a raw material are deposited on the silicon substrate 1 and then the deposited layer is vitrified into transparent glass.

Figure 2B:
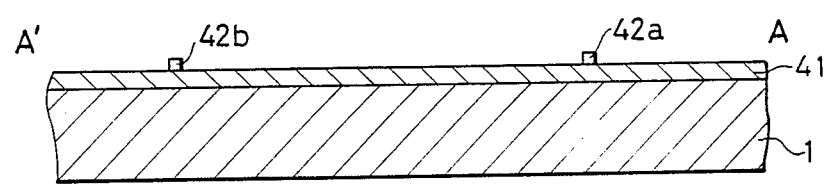

Subsequently, unnecessary portions of the core layer 42 are removed by a reactive ion etching process to form ridge-like core portions 42a and 42b, as shown in FIG. 2B.

Figure 2C:
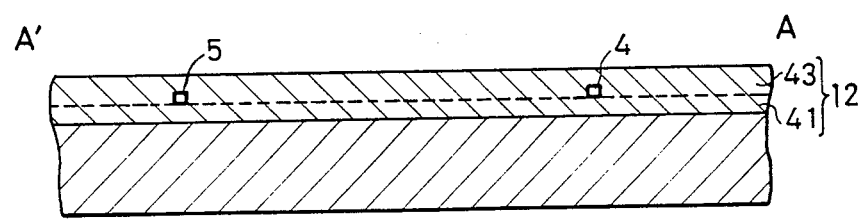

Then, as shown in FIG. 2C, an upper cladding layer 43 mainly composed of $SiO_2$ is formed by again making use of the flame hydrolysis technique, so that the core portions 42a and 42b are completely embedded in the lower and upper cladding layers 41 and 43 which integrally form the cladding layer 12 of the optical waveguide. In this embodiment, the core portions 42a and 42b form the optical waveguides 4 and 5, respectively. The formation per se of the channel waveguides according to the foregoing process is known and disclosed in the article by N. Takato et al. entitled "Low-Loss High-Silica Single-Mode Channel Waveguides", Electron Lett., 1986, Vol. 22, No. 6, pp. 321–322.

Figure 2D:
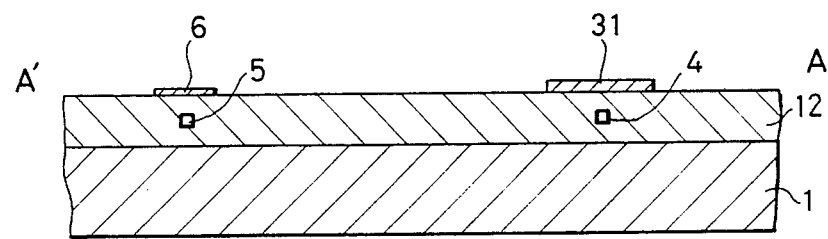

Referring next to FIG. 2D, an amorphous silicon film 31 serving as a stress applying film and a thin film heater 6 serving as a phase shifter, if necessary, are formed on the cladding layer 12, at positions corresponding to the optical waveguides 4 and 5, respectively. In this embodiment, the amorphous silicon film 31 was formed by a magnetron sputtering technique in which polycrystalline silicon was used as a target, while the thin film heater 6 was formed according to a vacuum vapor deposition method in which the metal chromium was used as an evaporation source. The sputtering atmosphere used to form the amorphous silicon film 31 according to the magnetron sputtering method was, for instance, an Ar gas to which an $H_2$ gas of 3 volume % was added.

Figure 2E:
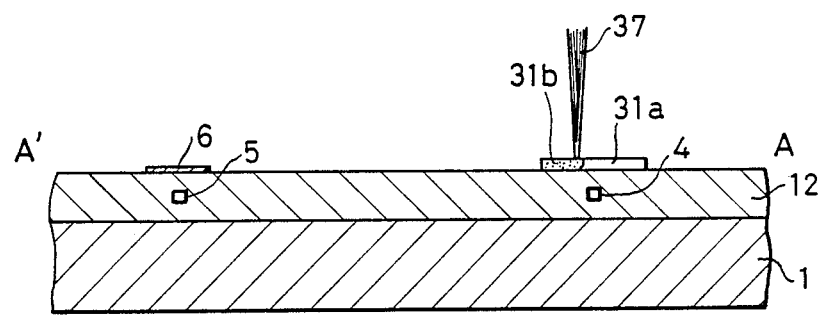

Next, in the process shown in FIG. 2E, a desired portion of the amorphous silicon film 31 is partially irradiated with an argon laser beam 37 for trimming to convert that portion of the amorphous silicon film 31 into polycrystalline silicon. As a result, a part of the optical waveguides corresponding to that polycrystalline silicon portion acquires the desired birefringence value.

The difference between the difference R in the optical paths between the polarization directions of the optical waveguide and N·λ (where N is an integer and λ is the light wavelength) plays an important role in determining the polarization characteristics of the integrated optical device. In this connection, R is given by the following equation:

$$R = \int B \cdot dl$$

, where l represents a line coordinate taken along the longitudinal direction of the optical waveguide.

According to the present invention, it is possible to impart the desired polarization characteristics to the integrated optical devices by finely adjusting the R value. In the interferometer of the present embodiment, the difference in the R values between the portions of the two optical waveguides 4 and 5, each of which is coupled to the two directional couplers 2 and 3 and of which the portions are defined by these waveguides, is of primary importance in determining the polarization characteristics of the integrated optical devices.

Figure 3:
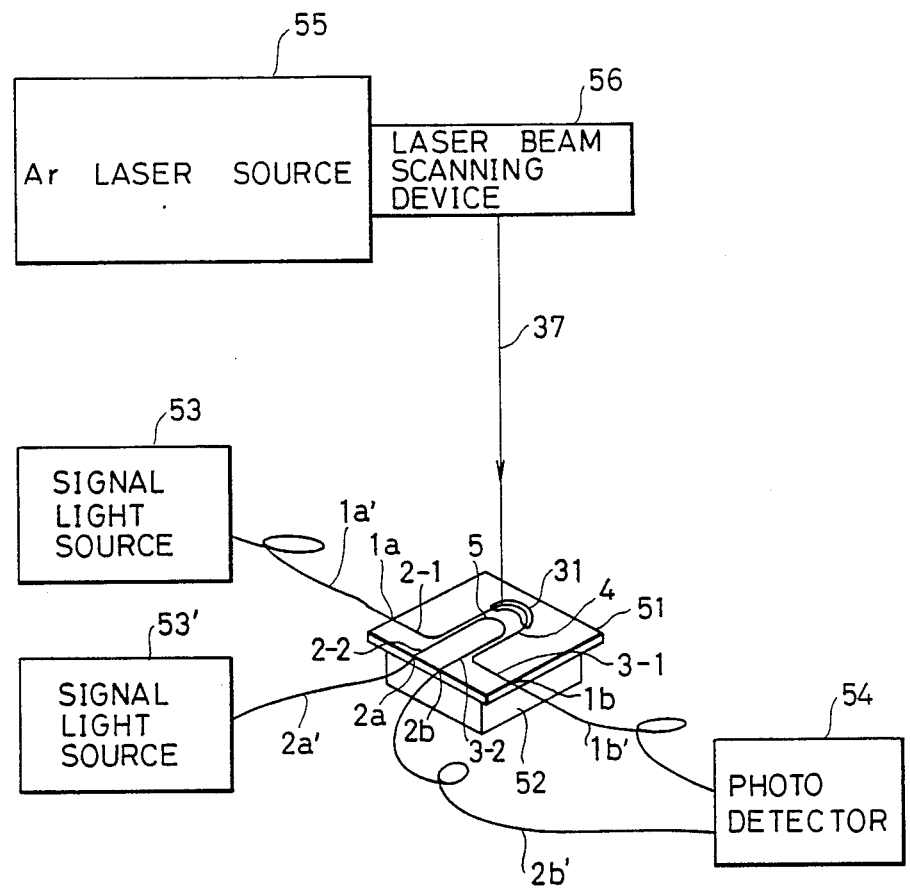
FIG. 3 is a schematic diagram showing an example of the structure of the laser trimming apparatus used in performing the method of the present invention.

The arrangement of an example of an apparatus for laser trimming used in the method of the present invention is shown in FIG. 3.

In FIG. 3, a specimen 51 for a guided-wave interferometer formed on the silicon substrate 1 is placed on a specimen table 52. This laser trimming apparatus has optical fibers 1a' and 2a' which, respectively, serve to input signal light from signal light sources 53 and 53' to the specimen 51. Optical fibers 1b' and 2b' guide the signal light from the interferometer 51 towards a photo detector device 54. The trimming apparatus further comprises an Ar laser source 55 for trimming and a laser beam scanning device 56 for scanning the laser beam from the laser source 55 on the amorphous silicon film 31 so as to irradiate a desired portion of the film 31 to be trimmed by the laser beam 37.

As mentioned above, the stress applying film 31 formed on the upper surface of the specimen 51 (in this case, the amorphous silicon film) is irradiated with the laser beam 37 obtained by scanning the laser beam from the argon laser source 55 by the laser beam scanning device 56. The temperature of the part of the amorphous silicon film irradiated with the laser beam is instantaneously increased to a high temperature by the heating effect of the laser beam and the heated portion of the film is converted into polycrystalline form. When the irradiation with the laser beam is stopped, the temperature of the film rapidly returns to room temperature, but there remains an irreversible change of the birefringence value of the optical waveguide corresponding to the portions irradiated with the laser beam. The input and output optical fibers 1a' and 2a' and 1b' and 2b' are never heated even when the laser beam is irradiated and, therefore, the polarization characteristics of the light outputted from the optical waveguides 3-1 and 3-2 can be monitored by introducing a monitoring light for monitoring into the optical waveguides 2-1 and 2-2. If the polarization characteristics are monitored by intermittently irradiating the amorphous silicon film 31 with the laser beam for trimming, it is possible to impart the desired birefringence polarization characteristics to the optical waveguide 4 with high precision.

The power of the Ar laser beam with which the amorphous silicon film is irradiated is, for instance, 1 W, and the diameter of the laser beam spot is, for instance, of the order of 20 μm.

When the power of the laser beam was increased, it was sometimes observed that the amorphous silicon film 31 was instantaneously evaporated instead of being converted into a polycrystalline silicon film. However, it is noted that this phenomenon can also be employed in the present invention to carry out the trimming for adjusting birefringence, as far as it does not deteriorate the underlying glass layer 12.

In the method of the present invention, a YAG laser source or the like may be used as the laser source 55 instead of the Ar laser source.

Figure 4A:
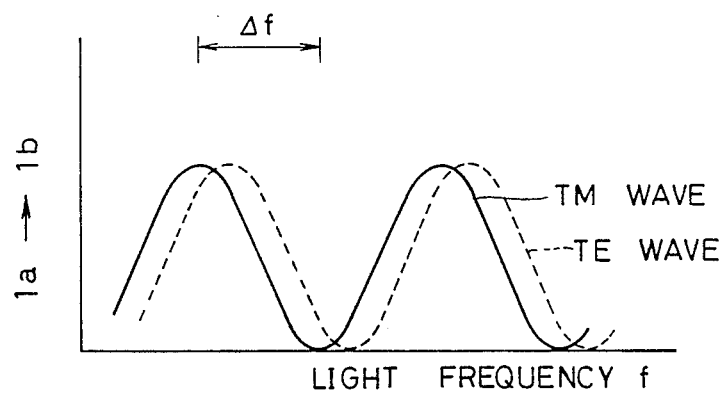
FIGS. 4A and 4B are explanatory diagrams illustrating polarization characteristics of the interferometer of the first embodiment.
Figure 4B:
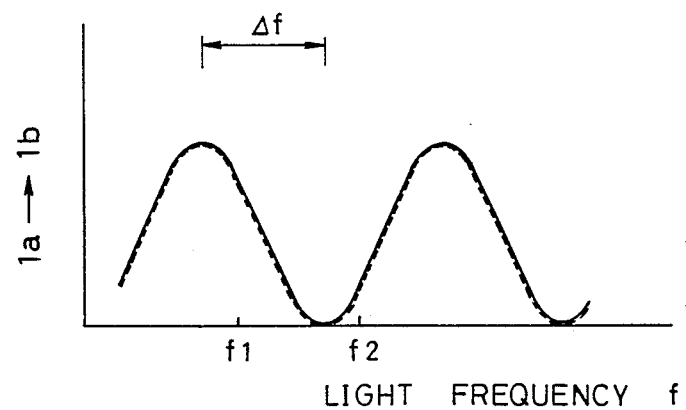

FIGS. 4A and 4B are explanatory diagrams for illustrating the polarization dependence of the light-outputting property of the interferometer, observed between the input port 1a and the output port 1b. These Figures show the change in the intensity of the light outputted from the output port 1b when the light frequencies of the TM and TE waves incident upon the input port 1a are changed. More specifically, FIG. 4A shows results observed before carrying out the laser trimming and FIG. 4B shows those observed after the laser trimming.

In FIG. 4A, that is, before carrying out the laser trimming, there is a discrepancy in the frequency response between the TE wave and the TM wave. Therefore, only one of the TE wave and the TM wave must be selectively incident upon the interferometer in order to operate the interferometer as a wave combining and splitting device, as already mentioned above.

When the amorphous silicon stress applying film 31 is trimmed while monitoring the polarization characteristics of the interferometer, the trimming operation is stopped when the frequency responses of the TM and the TE waves coincide with one another, as shown in FIG. 4B. Here, a slight difference in the optical path length difference (n·ΔL) between the two optical waveguides 4 and 5 connecting the two directional couplers 2 and 3 due to the polarization directions is coincident with m·λ, wherein m is an integer and λ is the wavelength of the signal light. The variation ΔB of B before and after the trimming is of the order of $1.5 \times 10^{-4}$ in the above-described embodiment. Therefore, if a length l* of a region where the amorphous silicon film is formed is established to satisfy the relation: $\Delta B \cdot l^* > \lambda$, namely l* > 10 mm, the polarization dependence can reliably be eliminated by the trimming.

The trimming apparatus shown in FIG. 3 could trim the stress applying film 31 at a high special resolution of approximately 20 μm and the difference R between the optical path lengths could be adjusted at an accuracy of one hundredth or less of the light wavelength.

In such an interferometer so designed as to eliminate the polarization dependence, the TE wave and the TM wave show the same frequency response as seen in FIG. 4B. Thus, the interferometer can operate as a optical frequency-division multi/demultiplexer, which is free of polarization dependence, by adjusting the phase shifter 6 in the form of thin film heater so that the positions of peaks and troughs of the frequency response are coincident with $f_1$ and $f_2(f_2 - f_1 = \Delta f)$.

Embodiment 2

Figure 5A:
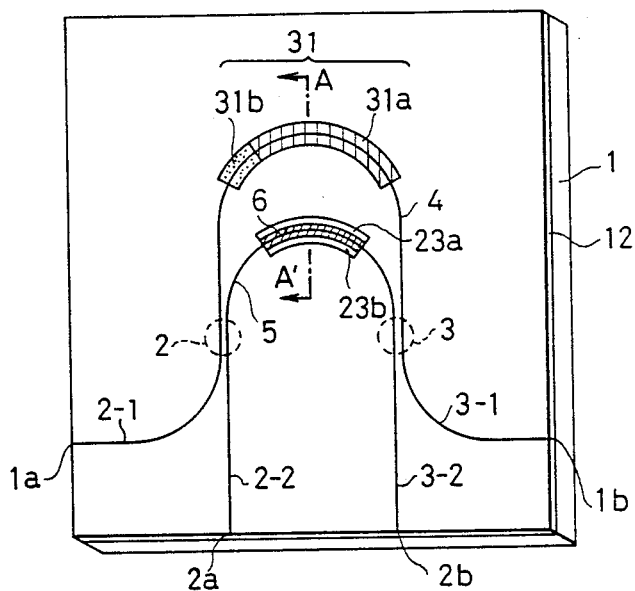
FIGS. 5A and 5B are a plan view and a cross sectional view, taken along line A-A' in FIG. 5A, showing an interferometer as the second embodiment of an integrated optical device according to the present invention, respectively.
Figure 5B:
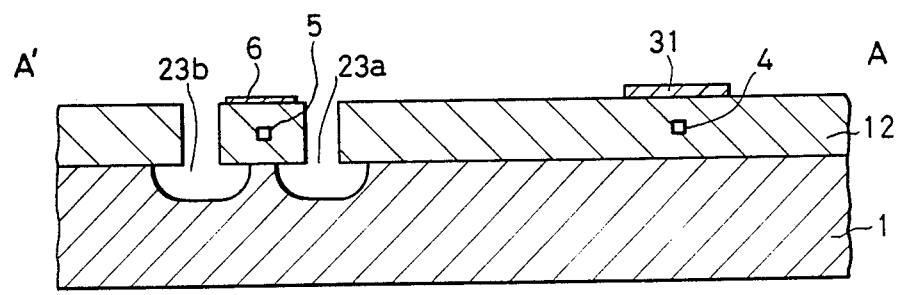

FIGS. 5A and 5B are, respectively, a plan view and an enlarged cross sectional view, taken along line A-A' in FIG. 5A, illustrating the configuration of a guided-wave interferometer as the second embodiment of an integrated optical device according to the present invention.

The second embodiment differs from the first embodiment shown in FIG. 1 in that heat insulating grooves 23a and 23b are disposed in the cladding layer 12 and on both sides of the optical waveguide 5. These heat insulating grooves 23a and 23b can be formed by etching out desired portions of the cladding layer 12 with a reactive ion etching process and then partially removing the exposed portions of the silicon substrate 1 by a chemical etching or reactive ion etching process.

Due to these heat insulating grooves 23a and 23b, the thin film heater 6 can effectively heat the optical waveguide 5 to raise its temperature and the heat generated by the heater 6 is prevented from being dissipated through the substrate 1 without being used.

The consumption power of the thin film heater 6 can be reduced to about 1/10 that in Embodiment 1 by providing the heat insulating grooves 23a and 23b.

It should, however, be noted that the heat insulating grooves 23a and 23b simultaneously function also as stress adjusting grooves 21a and 21b as shown in FIGS. 16A and 16B, and accordingly cause a great change in the birefringence value of the optical waveguide 5. In order to precisely estimate the influence of these heat insulating grooves 23a and 23b on the birefringence value, an optical circuit would need to be established on the basis of the analysis of a complex stress distribution and the working steps would need to be controlled without error. However, such precise control of the steps is impossible as a practical matter. On the contrary, the device according to the present invention is provided with the stress applying film 31 capable of being trimmed. The stress applying film 31 allows the device to compensate for the errors in designing and/or processing the device and to thus precisely control the polarization characteristics of the device (in this case, the elimination of the polarization dependence). Therefore, the device of the present invention (in this case, an interferometer) simultaneously satisfies the requirements for a reduction of the power consumption of the phase shifter and for precise control of the polarization characteristics.

Embodiment 3

Figure 6:
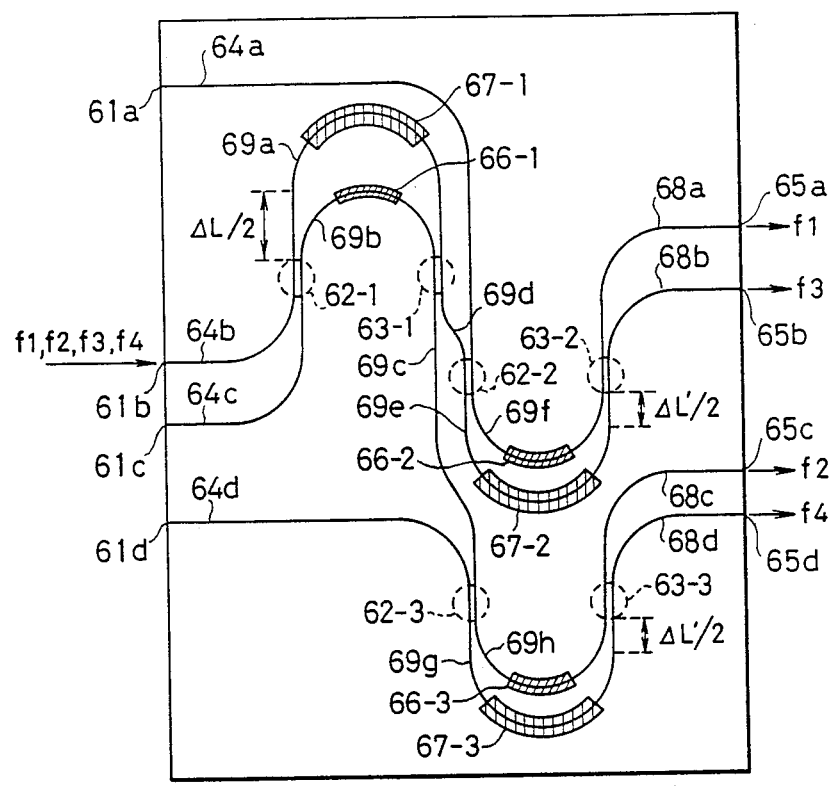
FIG. 6 is a plan view showing a two-stage interferometer as the third embodiment of an integrated optical device according to the present invention.

The configuration of a two-stage type interferometer as the third embodiment of an integrated optical device according to the present invention is shown in FIG. 6 as a plan view.

This embodiment has a construction based on that of the interferometer shown in FIG. 1 and comprises one interferometer having an optical path difference (ΔL) of approximately 10 mm and two interferometers having optical path differences (ΔL' = ΔL/2) of approximately 5 mm, which are connected to one another, as shown in FIG. 6.

In FIG. 6, reference numerals 61a through 61d denote input ports; 62-1 through 62-3 and 63-1 through 63-3 denote directional couplers, each of the three interferometers; 64a through 64d denote optical waveguides on the input side corresponding to the input ports 61a through 61d, respectively; and 65a through 65d denote output ports. Reference numerals 66-1 through 66-3 denote thin film heaters serving as phase shifters corresponding to the three interferometers, respectively; and 67-1 through 67-3 denote stress applying films corresponding to the three interferometers, respectively. Reference numerals 68a through 68d denote optical waveguides on the output side corresponding to the output ports 65a through 65d, respectively. Reference numerals 69a and 69b denote optical waveguides for coupling the directional couplers 62-1 and 63-1 to each other; 69c and 69d, denote optical waveguides for coupling the directional coupler 63-1 with the directional couplers 62-3 and 62-2, respectively; 69e and 69f, denote optical waveguides for coupling the directional couplers 62-2 and 63-2 to each other; and 69g and 69h, denote optical waveguides for coupling the directional couplers 62-3 and 63-3 to each other.

The construction shown in FIG. 6 constitutes, as a whole, a 4-channel optical frequency-division multi/demultiplexing device which has important fields of application. Amorphous silicon films 67-1 through 67-3 as stress applying films are, respectively, disposed on the optical waveguides 69a, 69e and 69g which constitute the corresponding interferometers.

Thin film heaters, i.e., phase shifters 66-1, 66-2 and 66-3 for finely adjusting the optical path length are disposed on the other corresponding optical waveguides 69b, 69f and 69h of the respective interferometers.

The polarization dependence of this two-stage type interferometer can be cancelled according to the following procedures.

First, the amorphous silicon film 67-2 is subjected to a laser trimming treatment, while the frequency dependence of the frequency response of the light outputted from the output port 65a is monitored by making a signal light incident through the input port 61a, and thus the polarization dependence of the interferometer on which the amorphous silicon film 67-2 is formed is eliminated.

Then, the same procedures are effected with respect to the input port 61d and the output port 65d to eliminate the polarization dependence of the interferometer having thereon the amorphous silicon film 67-3.

After cancelling the polarization dependence of the two interferometers in the second stage of the two-stage interferometer, a signal light is inputted to the input port 61b. Then, the light outputted from the output ports 65a and that from the output port 65b are summed up so as to be able to neglect the interference effect of the interferometers in the second stage, and while monitoring the polarization dependence of the light frequency response of the summed output light, the amorphous silicon film 67-1 is trimmed to cancel the polarization dependence of the first stage of the interferometer.

After cancelling the polarization dependence of all the interferometers in this manner, electric powers is supplied to the thin film heaters or phase shifters 66-1, 66-2 and 66-3 and varied to carry out fine adjustment of the light frequency responses of the respective interferometers in the transverse direction (direction of the light frequency axis). As a result, a optical frequency-division multi/demultiplexer handling 4-channel signal lights $f_1$, $f_2$, $f_3$ and $f_4$ having an interval of 10 GHz and having no polarization dependence can be obtained.

It is a matter of course that the present invention is likewise applicable to construction of multi-stage interferometers (or multi-channel optical frequency-devision multi/demultiplexing device).

Embodiment 4

Figure 7:
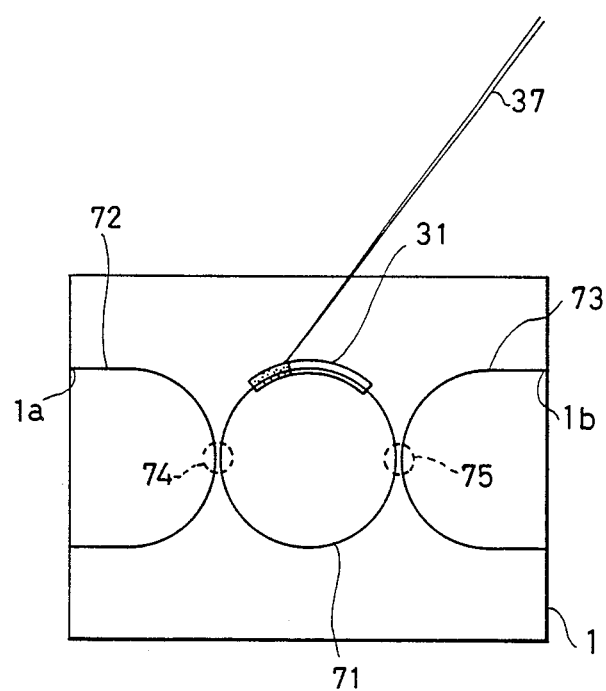
FIG. 7 is a plan view showing a ring resonator as the fourth embodiment of an integrated optical device according to the present invention.

The configuration of a guided-wave ring resonator as the fourth embodiment of an integrated optical device according to the present invention is shown in FIG. 7.

In the construction shown in FIG. 7, a ring-like optical waveguide 71 is disposed on a silicon substrate 1 in such a way that the optical waveguide 71 is optically coupled with an input optical waveguide 72 and an output optical waveguide 73 via directional couplers 74 and 75, respectively. Here, each of the optical waveguides 71, 72 and 73 are composed of a silica-based single-mode optical waveguide. The coupling factors of the directional couplers 74 and 75 are determined to be approximately within a range from several % to 10%. Above the ring-like optical waveguide 71, there is disposed an amorphous silicon film as a stress applying film 31 which can adjust the stress applied to the optical waveguide 71 by trimming the film 31 with the laser beam 37.

Figure 8A:
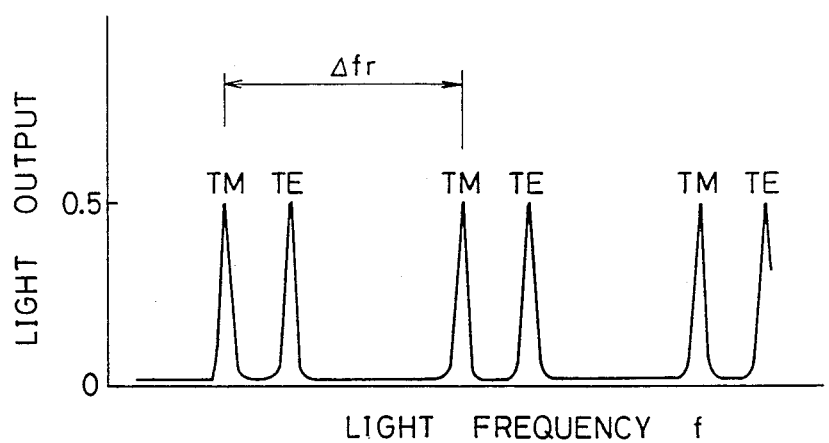
FIGS. 8A and 8B are explanatory diagrams illustrating polarization characteristics of the ring resonator.
Figure 8B:
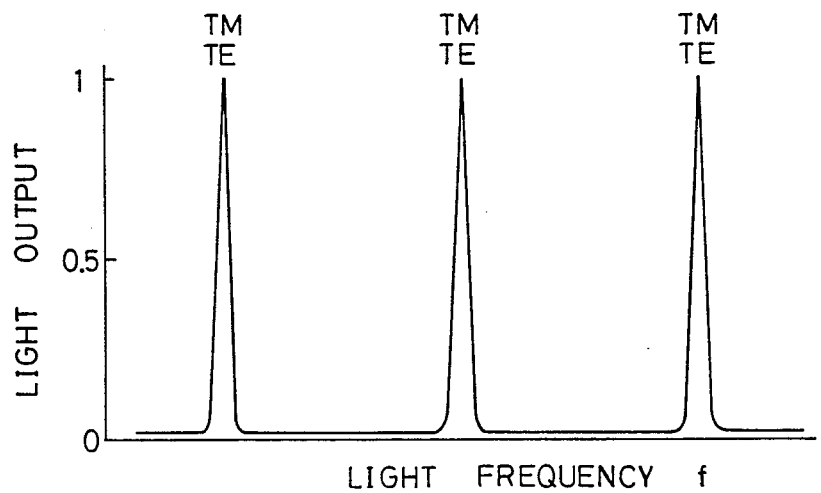

FIGS. 8A and 8B are graphs showing the frequency response characteristics of the light outputted from the output port 1b, when a signal light in the form of a mixed TE and TM waves is inputted through the input port 1a. FIG. 8A shows the characteristics before trimming. The ring resonator before trimming provides a periodic resonance characteristic inherent to such a ring resonator, while the responses of the TM and TE waves deviate from one another. On the other hand, FIG. 8B shows the frequency response characteristics of the resonator after trimming is performed to cancel the deviation in the light frequency response. After the trimming, the polarization dependence of this ring resonator is cancelled.

The frequency period $\Delta f_r$ of the ring resonator has a relationship with the circumferential length $L_{ring}$ of the ring-like optical waveguide 71 as follows:

$$\Delta f_r = c/(n \cdot L_{ring})$$

In this embodiment, the circumferential length $L_{ring}$ is approximately 40 mm and the period $\Delta f_r$ is 5GHz. The slight difference between the optical paths $n \cdot L_{ring}$ of the ring-like optical waveguide 71 due to the difference in the polarization direction is thus set at a value equal to an integer multiple of the wavelength of the signal light by trimming the stress applying film 31.

In the foregoing embodiments, the present invention has been explained referring to the cases in which integrated optical devices free of polarization dependence are provided. In contrast, in the following embodiment, an integrated optical device exhibiting a desired polarization dependence will be explained.

Embodiment 5

Figure 9A:
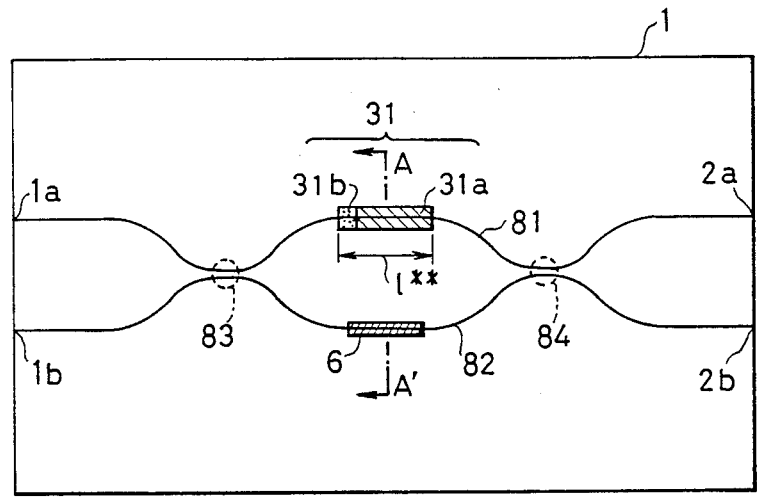
FIGS. 9A and 9B are a plan view and a cross sectional view, taken along line A-A' in FIG. 9A, showing a polarization beam splitter as the fifth embodiment of an integrated optical device according to the present invention, respectively.
Figure 9B:
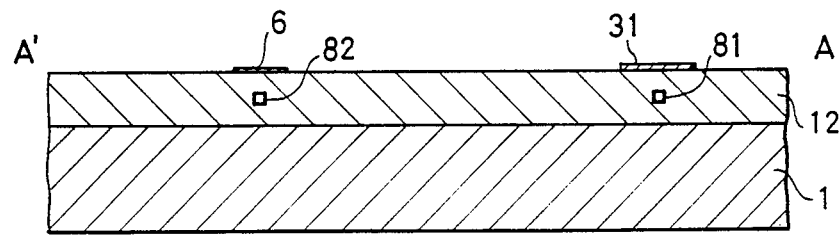

FIGS. 9A and 9B are, respectively, a plan view and an enlarged cross sectional view, taken along line A-A' of FIG. 9A, illustrating the structure of a guided-wave polarization beam splitter as the fifth embodiment of the integrated optical device according to the present invention.

As shown in FIGS. 9A and 9B, in this embodiment, two silica-based single-mode optical waveguides 81 and 82 are disposed on a silicon substrate 1 in such a way that the two optical waveguides 81 and 82 come close to one another at two portions to form two directional couplers 83 and 84, having a coupling factor of approximately 50%. This structure as a whole constitutes a symmetrical Mach-Zehnder interferometer. A thin film heater 6 as a phase shifter is disposed on one of the two optical waveguides 81 and 82 (in this embodiment, the optical waveguide 82) which couples the two directional couplers 83 and 84 to each other and an amorphous silicon film 31 having a length of l and serving as a stress applying film is disposed on the other optical waveguide (in this case, the optical waveguide 81). The optical path lengths of the two optical waveguides 81 and 82 are different, by $\Delta R = \Delta B \cdot l$, from each other according to the polarization directions, because of the amorphous silicon film 31.

Here, if a part 31b of the amorphous silicon film 31 is trimmed with a laser beam so that $\Delta R$ is equal to one half of the light wavelength, the device shown in FIGS. 9A and 9B can function as a polarization beam splitter.

Namely, a signal light inputted through the input port 1a can be divided into two components, for instance, a TE component outputted from the output port 2a and a TM component outputted from the output port 2b. Moreover, if power supplied to the thin film heater 6 is varied to change the optical path length of the optical waveguide 82 beneath the heater 6, by one half of the light wavelength, by the thermo-optical effect, the output ports from which the TE and TM components are outputted, respectively, can be reversed.

In effect, the birefringence value of the optical waveguide 82 beneath the thin film heater 6 is possibly slightly changed due to the presence of the heater per se in addition to the change due to the amorphous silicon film as the stress applying film 31. However, according to the construction of the present invention, the trimming of the stress applying film 31 can be effected so as to achieve the desired polarization characteristics, taking the stress exerted by the thin film heater 6 into consideration. Therefore, a slight change in the birefringence due to the thin film heater 6 can be neglected and does not cause a problem.

In the aforementioned embodiment, the amorphous silicon stress applying film 31 has a width (W) of 200 $\mu$m and a thickness (d) of 6 $\mu$m, and the change in the birefringence value ($\Delta B$) before and after the trimming was of the order of $1.5 \times 10^{-4}$. The change $\Delta B$ may be varied by properly selecting the values of W and/or d. For example, it was confirmed that the value $\Delta B$ varies substantially in proportion to the d value provided that $0 < d < 10$ $\mu$m. It should be noted that it was also observed that the birefringence value was sometimes rather increased by the trimming, if the value W is of the order of 100 $\mu$m or less. In any case, according to the present invention, if the values of W and d are set roughly by simulation study or a preexamination on the basis of calculation of the stress distribution, then the birefringence value can be adjusted finely by carrying out the trimming. Therefore, these phenomena do not cause a problem.

The birefringence value returns substantially to its original value observed when the stress applying film is not provided, if the amorphous silicon film is converted into a polycrystalline film by the trimming. Therefore, the polycrystalline silicon film exerts only a very slight influence on the birefringence value.

In the foregoing embodiment, an amorphous silicon film is used as the stress applying film 31, because the amorphous silicon can be formed into a film relatively easily by a process such as magnetron sputter technique and the patterning thereof is also easily carried out by a dry process such as reactive ion etching. The amorphous silicon film may be formed in such a manner that a strong compression stress exists within the film, which in turn exerts a tensile stress on the optical waveguide under the film. As the material for forming the stress applying film 31, materials other than amorphous silicon may be used in the present invention, as far as they provide a film which exerts a strong stress on an optical waveguide or a core portion thereof beneath the film, when the film is disposed on the cladding layer, and in addition the stress condition can be varied irreversibly by applying external stimulation.

In general, the thin films which are formed in a plasma atmosphere according to a method such as the sputter or plasma CVD method are in a metastable condition. For this reason, it is often observed that the films thus formed exhibit an extremely high residual compression stress which cannot be expected under a usual thermal equilibrium condition. A typical example of such a film is the foregoing amorphous silicon film. Similar phenomena are also observed in the case of an amorphous metal film such as a Co-Zr film or an amorphous silicon nitride film, which may be used as the stress applying film of this invention. In general, an amorphous film is more desirable compared with a crystalline film, since the former exhibits strength and toughness higher than those of the latter and the former causes little stress relaxation due to the creep phenomenon. It is not desirable for the purpose of this invention to generate a residual tensile stress within the stress applying film, which easily leads to the formation of cracks in the film and the like.

While the aforementioned amorphous silicon stress applying film 31 is stable for a long period of time under the environment usually encountered, substantially at room temperature, the so-called passivation technique may be employed in particular when high reliability is required. In other words, after forming the amorphous silicon film, a protective layer such as a thin film of $SiO_2$ or a silicon nitride film may be formed thereon to prevent the amorphous silicon film from being modified due to the moisture in the air or the like. Since the $SiO_2$ film and the silicon nitride film are transparent, the laser trimming can be effected through these films.

Examples of the external stimulation by which the stress of the stress applying film 31 can irreversibly be changed include irradiation with infrared light or a treatment for changing the properties of the stress applying film or for damaging the film by discharge or dielectric breakdown due to the application of a high electric voltage to the film, in addition to the irradiation with a laser beam. However, laser trimming is most practical, since laser trimming is a treatment effected without contact and has a high spacial resolution, and fine adjustment of the stress condition can easily be achieved.

While in this embodiment, the amorphous silicon film as the stress applying film 31 is formed only on the specific part of the cladding layer 12, the present invention is not restricted to such a specific example. The stress applying film 31 may be uniformly formed, for instance, over a wide area of the cladding layer 12 and then desired parts of the film, for example, a portion of the film corresponding to and above the core portion, may be trimmed.

Alternatively, a chemical etching technique may also be adopted to effect trimming of the stress applying film 31 instead of the laser trimming technique. Namely, the stress applying film 31 may be trimmed by applying a chemical etching liquid to a desired part of the stress applying film 31 to etch the film 31 while monitoring the properties of the device which is being processed, and then by blowing off the etching liquid immediately after the desired properties are attained. However, the chemical etching process is complicated, since it requires a post-washing treatment or the like.

In the case where an $SiO_2$-$B_2O_3$ glass film formed from a raw material composed of an $SiCl_4$-$BCl_3$ mixed gas is used as the upper cladding layer in the example of the steps shown in FIGS. 2A through 2E, it is possible that the upper cladding layer 12 simultaneously serves also as the stress applying film, even though this is a special example. More specifically, the stress condition can be adjusted by the upper cladding layer 12 by making use of the fact that the silica glass containing about 10 mole % or more of $B_2O_3$ easily changes its glass state by a heat treatment. For instance, the stress-induced birefringence exerted on the core portion can be changed by first irradiating a desired portion of the cladding layer 12 with a $CO_2$ gas laser beam to heat the portion at a temperature of about 500° C. or more and then by air-cooling the portion.

However, it should be noted that this method cannot widely be employed for the following reasons:

(1) The composition of the cladding layer is often defined by other requirements, such as the setting of a difference in the refractive index, chemical durability or the like and, therefore, it is not possible to add $B_2O_3$ to the cladding layer freely in any desired amount;

(2) The refractive index per se of the $SiO_2$-$B_2O_3$ glass is also varied by the aforementioned trimming operation and, as a result, it becomes difficult to adjust only the birefringence of the optical waveguide without causing a substantial change in the structure of the optical waveguide.

Embodiment 6

Figure 10:
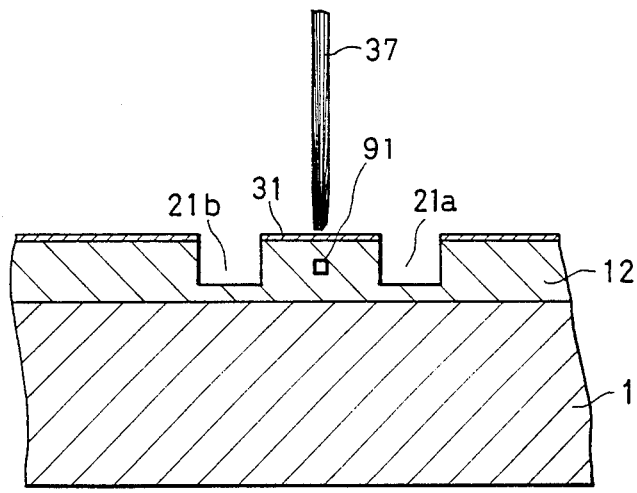
FIG. 10 is a cross sectional view showing an optical waveguide as the sixth embodiment of an integrated optical device according to the present invention.

FIG. 10 is a cross sectional view showing the sectional structure of a trimmed portion of an optical waveguide as the sixth embodiment of the present invention. In this sixth embodiment, the stress applying film 31 is substantially uniformly formed on the upper surface of the cladding layer 12 in advance. Then, the stress adjusting grooves 21a and 21b are formed within the cladding layer 12 on both sides of an optical waveguide 91 and the birefringence value thereof is approximately adjusted to a desired value. Subsequently, the stress applying film 31 formed on the upper cladding layer 12 is trimmed to precisely tune the birefringence characteristics or the polarization characteristics of the device. According to this sixth embodiment, the birefringence can precisely be controlled over a wide range.

For instance, in the case of the amorphous silicon stress applying film as explained in Embodiment 1, the birefringence value B varies from about $3.5 \times 10^{-4}$ (before trimming) to about $5.0 \times 10^{-4}$ (after trimming). However, it is difficult to set the value B at a value not more than $10^{-4}$. In contrast, according to the sixth embodiment shown in FIG. 10, the birefringence value can precisely be controlled by setting the position, the depth or the like of the stress adjusting grooves 21a and 21b in advance properly, so that the value B is substantially zero, and then by trimming the stress applying film 31 to precisely perform fine adjustment, even if the desired value B is in the range of not more than $10^{-4}$. Thus, if a combination of the stress adjusting grooves 21a and 21b and the stress applying film 31 capable of being trimmed is employed, the birefringence value can widely be adjusted.

While in the aforementioned embodiments, the present invention has been explained with reference to integrated optical device mainly composed of silica-based optical waveguides formed on a silicon substrate, it is a matter of course that the present invention is readily and equally applicable to silica-based optical waveguides disposed on a substrate of, for instance, silica glass or sapphire. Alternatively, the present invention can be applied to integrated optical devices provided with optical waveguides of materials other than silica-based glass, such as those provided with, for instance, multi-component glass optical waveguides, $LiNbO_3$ optical waveguides, semiconductor optical waveguides and magnetic material optical waveguides.

Embodiment 7

Figure 11:
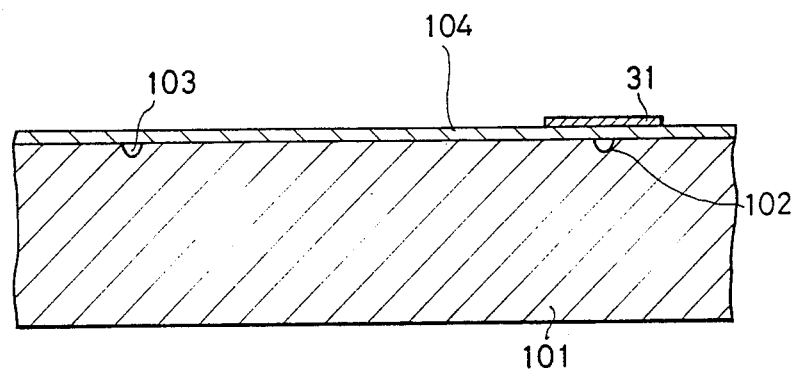
FIG. 11 is a sectional view showing a multicomponent glass system optical waveguide as the seventh embodiment of an integrated optical device according to the present invention.

FIG. 11 is a sectional view showing the sectional structure of a multi-component glass integrated optical device as the seventh embodiment of the present invention. Core portions 102 and 103 are formed in the vicinity of the upper surface of an optical crown glass substrate 101 as a multi-component glass substrate by a Cs ion diffusing method. Single-mode optical waveguides comprised of these core portions 102 and 103 are arranged in a desired optical circuit pattern such as an interferometer, a ring resonator or the like. In this embodiment, the glass substrate 101 per se simultaneously serves also as a lower cladding layer. An upper cladding layer 104 is further disposed on the upper surface of the core portions 102 and 103 by depositing an $SiO_2$ glass layer on the core portions 102 and 103 in accordance with the sputtering method. The amorphous silicon film 31 serving as the stress applying film capable of being trimmed is disposed at a desired portion or portions of the upper cladding layer 104.

The multi-component glass type optical waveguide formed by the ion diffusion method in general exhibits stress-induced birefringence due to the difference between the glass compositions of the core portion and the substrate. On the other hand, in an integrated optical device having such a construction as that shown in FIG. 11, desired birefringence characteristics can be imparted to the device by trimming the amorphous silicon stress applying film 31. The reason why the $SiO_2$ glass layer 104 is arranged between the stress applying film 31 and the core portion 102 is to prevent the amorphous silicon film 31 from absorbing the light transmitted through the core portion 102. If the amorphous silicon film 31 is formed so close to the core portion 102, the transmitted light in the core portion 102 is absorbed by the film 31. In other words, this arrangement is made in consideration of the fact that the core portion of the optical waveguide formed according to the ion diffusion method is situated near the surface of the substrate.

Embodiment 8

Figure 12:
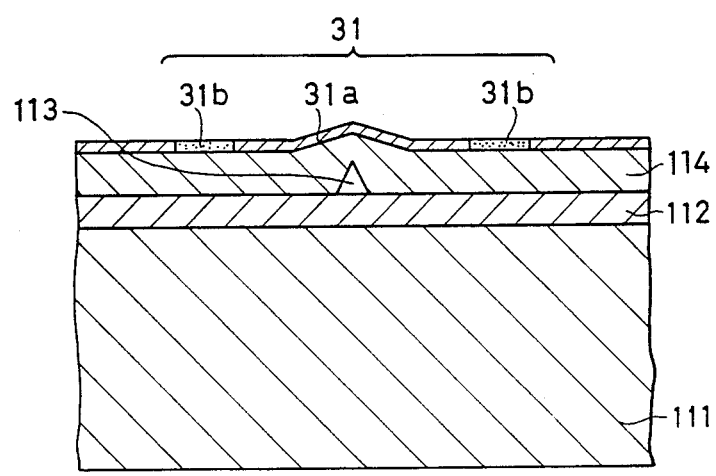
FIG. 12 is a cross sectional view showing a YIG optical waveguide as the eighth embodiment of an integrated optical device according to the present invention.

FIG. 12 is a cross sectional view showing the sectional structure of a YIG optical waveguide type device as the eighth embodiment of the present invention.

In this embodiment, a YIG single-mode optical waveguide having a lower cladding layer 112, a core portion 113 and an upper cladding layer 114 is formed on a GGG crystalline substrate 111 in accordance with a combination of the Liquid-Phase Epitaxial Method (LPE method) and an etching method. The amorphous silicon film 31 serving as the stress applying film capable of being trimmed is disposed on the upper cladding layer 114.

The YIG optical waveguide on the GGG substrate generally exhibits stress-induced birefringence which results from the difference in the thermal expansion coefficient between the substrate and the optical waveguide. When such a YIG optical waveguide is used as a guided-wave light isolator, the birefringence value must be tuned to zero in order to ensure a smooth Farady rotation. According to the construction shown in FIG. 12, such precise tuning can be achieved by trimming the width of the stress applying film 31 while simultaneously monitoring the polarization characteristics of the core portion 113.

Further, while in the embodiments explained above, such as embodiments 1, 2, 3 and so on, the polarization characteristics of the device are determined by an integral value of the birefringence value B of the optical waveguide integrated over a desired length of the optical waveguide, in this eighth embodiment, it is required that the value B per se be zero over the entire length of the optical waveguide. For this purpose, it is effective to uniformly finely adjust the width of the non-trimmed area 31a of the stress applying film 31 by trimming the width to reduce the birefringence value of the optical waveguide substantially to zero (of the order of $10^{-5}$ or less).

It is of course necessary to properly select the YIG compositions during the manufacturing process of the optical waveguide to make the birefringence value close to zero in advance, so that the birefringence value is set within a range in which the birefringence can be adjusted by trimming the stress applying film 31.

According to the method of this embodiment, an optical waveguide device for a light isolator can be fabricated with a good reproducibility, while allowing for error when the YIG optical waveguide is fabricated.

It is natural that this embodiment may also have the same construction as that in Embodiment 5, i.e. the provision of both the stress adjusting grooves and the stress applying film. That is, stress adjusting grooves may be formed on both sides of the core portion 113 shown in FIG. 12 according to an etching process, so that the birefringence value of the core portion 113 is substantially equal to zero, and the final adjustment is carried out by trimming the stress applying film 31.

While in the embodiments discussed above, the stress applying film 31 is arranged above the core portion of the optical waveguide in such a way that the symmetry between the right and the left halves of the film 31 is satisfied, the present invention is not limited to such a specific embodiment and if necessary, an asymmetrical arrangement between the right and the left halves is also acceptable in the present invention, as will be shown in the following embodiment.

Embodiment 9

Figure 13A:
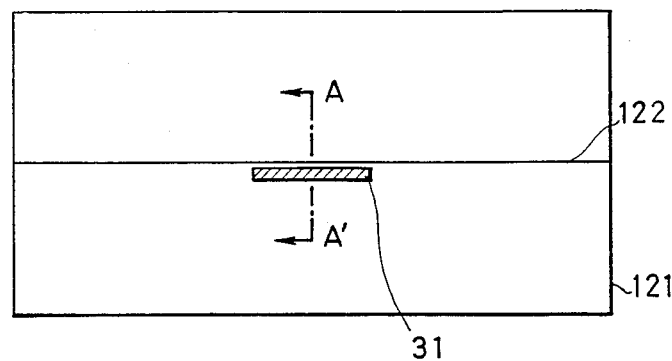
FIGS. 13A and 13B are a plan view and a cross sectional view, taken along line A-A' in FIG. 13A, showing a guide-wave wave plate as the ninth embodiment of an integrated optical device according to the present invention.
Figure 13B:
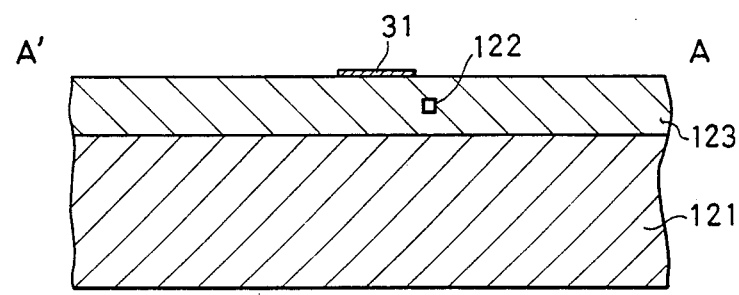

FIGS. 13A and 13B are, respectively, a plan view and an enlarged cross sectional view, taken along line A-A' of FIG. 13A, showing the construction of the ninth embodiment of this invention.

In this embodiment, a core portion 122 of silica-based glass and a cladding layer 123 of silica-based glass formed to cover the core portion 122 are disposed on a silica glass substrate 121. The amorphous silicon stress applying film 31 is disposed on the cladding layer 123 corresponding to the core portion 122 over a desired length and only on one side of the core portion 122. The silica-based optical waveguide on the silica glass substrate 121 exhibits only a relatively small stress-induced birefringence. However, the stress applying film 31 disposed on one side of the core portion 122 serves to exert a stress-induced birefringence, of which the principal axis of the birefringence is inclined with respect to the direction perpendicular to the substrate 121, on the optical waveguide 122 beneath the film 31. Therefore, the device shown in FIGS. 13A and 13B as a whole functions as a guided-wave light wave plate. Since the stress applying film 31 capable of being trimmed with a laser is used in this device, a desired wave plate can be formed with high accuracy by trimming suitably the width and the length of the stress applying film 31.

Finally, it should be emphasized that the present invention is not restricted to integrated optical devices of the materials specifically illustrated in the foregoing embodiments, and that the present invention is applicable to other integrated optical devices of other materials. In particular, $LiNbO_3$ materials exhibit a photo elastic constant higher than those of glass materials or YIG materials and, therefore, the present invention is preferably applicable to $LiNbO_3$ integrated optical devices. For instance, if a stress applying film capable of being trimmed is arranged in the vicinity of the coupling portion of an $LiNbO_3$ directional coupler, the coupling factor and the polarization dependence of the directional coupler can precisely be adjusted by the stress-induced birefringence effect of the film. Thus the present invention is quite effective with an $LiNbO_3$ integrated optical device, such as an optical switch and an optical modulator having such a directional coupler as a fundamental element.

As discussed above in detail, according to the present invention, the birefringence characteristics of an optical waveguide and hence the polarization characteristics of an integrated optical device can be precisely controlled by disposing a stress applying film, the stress condition of which is variable by applying an external stimulation to the film, i.e., by trimming the film, on a cladding layer of an optical waveguide. The stress applying film can be trimmed while the optical fibers are connected to the input and the output portions of the optical device. Consequently, so-called on-line monitoring control is available. Therefore, the present invention is extremely effective for constructing precisely an integrated optical device for optical communication, for optical sensing or for optical signal processing, in which the polarization characteristics play an important role.

In addition, the present invention is also applicable to a case where an optical path length is finely adjusted with an accuracy of 1/100 or less times the light wavelength of the optical waveguide in addition to the control of the birefringence value of the optical waveguide. The fine adjustment of such an optical path makes use of the variation in the refractive index of the optical waveguide in the longitudinal direction thereof as a result of the trimming of the stress applying film, although the variation is very small.

It would be expected that the precise setting of the birefringence value and the optical path length takes an important role in developing an integrated optical device for optical communication using a coherent light, in which light wave are treated like microwaves.

The invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for manufacturing an integrated optical device, comprising the steps of:
   forming a single-mode optical waveguide on a substrate, said single-mode optical waveguide having a core portion embedded in a cladding layer for transmitting light therethrough; and
   forming, on said cladding layer, a stress applying film so that said stress applying film exhibits residual stress, for exerting a stress on said single-mode optical waveguide and for irreversibly changing the stress by trimming said stress applying film.

2. A method as claimed in claim 1, further comprising the step of partially trimming said stress applying film to adjust a stress-induced birefringence value of a part of said single-mode optical waveguide lying under the trimmed portion of said stress applying film to adjust the optical characteristics of said integrated optical device.

3. A method as claimed in claim 2, wherein a monitoring light is made incident upon said integrated optical device in said step of trimming said stress applying film, and wherein said stress applying film is trimmed while said optical characteristics are monitored.

4. A method as claimed in claim 2, wherein in said step of trimming said stress applying film, said stress applying film is trimmed by partially irradiating a light beam on said stress applying film.

5. A method for manufacturing an integrated optical device, comprising the steps of:
 (a) forming a single-mode optical waveguide on a substrate, the optical waveguide having a cladding layer and having an elongated core embedded in the cladding layer;
 (b) forming a stress applying film on the cladding layer above the core to exert stress on the optical waveguide, the stress applying film exhibiting residual stress; and
 (c) permanently modifying a first portion of the stress applying film to irreversibly change the stress exerted on the waveguide by the stress applying film, a second portion of the stress applying film remaining unmodified during step (c).

6. The method of claim 5, wherein step (c) is conducted by changing the physical state of the first portion of the stress applying film.

7. The method of claim 5, wherein step (b) is conducted by forming an amorphous silicon film as the stress applying film, and wherein step (c) comprises the step of changing the first portion of the amorphous silicon film to polycrystalline silicon.

8. The method of claim 7, wherein the step of changing the first portion of the amorphous silicon film to polycrystalline silicon comprises the step of heating the first portion of the amorphous silicon film.

9. The method of claim 7, wherein the step of changing the first portion of the amorphous silicon film to polycrystalline silicon comprises the step of directing light from a laser toward the first portion of the amorphous silicon film.

10. The method of claim 5, further comprising the step of directing a monitoring light through the core while step (c) is conducted.

11. An integrated optical device made by the method of claim 5.

12. A method for manufacturing an integrated optical device, comprising the steps of:
 (a) forming first and second single-mode optical waveguides on a substrate, the first optical waveguide having an elongated first core embedded in a cladding layer and the second optical waveguide having an elongated second core embedded in the cladding layer, the first core following a first path and the second core following a second path having a portion which passes adjacent a corresponding portion of the first path to provide a coupler between the first and second optical waveguides;
 (b) forming a stress applying film on the cladding layer above the first core to exert stress on the first optical waveguide, the stress applying film exhibiting residual stress; and
 (c) permanently modifying a first portion of the stress applying film to irreversibly change the stress exerted on the first waveguide by the stress applying film, a second portion of the stress applying film remaining unmodified during step (c).

13. The method of claim 12, wherein step (b) is conducted by changing the physical state of the first portion of the stress applying film.

14. The method of claim 12, wherein step (b) is conducted by forming an amorphous silicon film as the stress applying film, and wherein step (c) comprises the step of changing the first portion of the amorphous silicon film to polycrystalline silicon.

15. The method of claim 12, further comprising the step of depositing a heater film on the cladding layer above the second core.

16. The method of claim 15, further comprising the step of making a groove in the cladding layer adjacent the heater film.

17. The method of claim 12, further comprising the steps of directing a first monitoring light through the first core and directing a second monitoring light through the second core while conducting step (c).

18. The method of claim 12, wherein step (b) is accomplished by sputtering.

19. An integrated optical device made by the method of claim 12.

* * * * *